Figure 1:
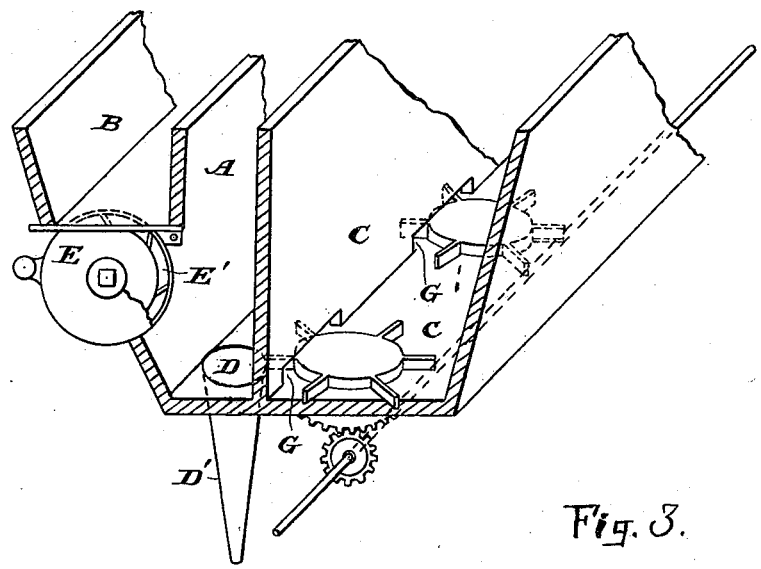

No. 644,220. Patented Feb. 27, 1900.
I. J. WEAVER.
FEED BOX FOR SEED AND FERTILIZER MIXING AND SOWING MACHINES.
(Application filed Dec. 23, 1899.)
(No Model.)

WITNESSES:
INVENTOR
Isaac Job Weaver
BY
Richard R
ATTORNEYS

UNITED STATES PATENT OFFICE.

ISAAC JOB WEAVER, OF BOORT, VICTORIA, ASSIGNOR OF ONE-HALF TO STEPHEN PURSER, OF BENDIGO, VICTORIA.

FEED-BOX FOR SEED AND FERTILIZER MIXING AND SOWING MACHINES.

SPECIFICATION forming part of Letters Patent No. 644,220, dated February 27, 1900.

Application filed December 23, 1899. Serial No. 741,449. (No model.)

*To all whom it may concern:*

Be it known that I, ISAAC JOB WEAVER, farmer, a British subject, residing at Boort, in the Colony of Victoria, have invented new and useful Improvements in the Feed-Boxes of Seed and Fertilizer Mixing and Sowing Machines, of which the following is a specification.

The supply-box commonly used in seed and fertilizer mixing and sowing machines is confined to a box with a central longitudinal partition converting it into two compartments, one carrying and feeding the seed and the other the fertilizer directly into a series of shoes or receivers, and drill extensions projecting downward therefrom, the continuous feeding operation being brought about by gear-wheels and connections well known and forming no part of my invention. By reason of the gear-wheels operating directly on and under the supply-compartments they have been found liable to clog at intervals unknown to the driver, causing a failure or partial failure of the feed-supply of one, other, or both materials, and although they may ultimately clear and resume operation it has been found to cause a decrease in the yield brought about by patchy and intermittent sowing, which can only be discovered when too late. I obviate this serious and costly defect by constructing a supply-box of three compartments or bins instead of two, the central compartment being and remaining always partially empty, while the two outer compartments carry the supply of the seed and fertilizer, respectively. The series of shoes, receivers, and drills are mounted in rotation under the central compartment, while the feed gear-wheels and connections are so placed as to feed the respective materials into the shoe-receivers opening in the floor of such central compartment, so that while providing for a full and continuous feed and commingling of the seed and fertilizer the central compartment remains partially empty, disclosing to the driver's view the feeding operation, by which means with reasonable care any clogging or discontinuance of the feeding operation must be seen at once by the driver, restored to perfect working order, and the sowing resumed. I claim, however, that defective or intermittent sowing would be much less liable to occur in my method of indirect feed-supply by providing a central compartment and feeding thence to the shoe-receivers, as above described.

In order that my said invention may be more clearly understood, I will now describe same in detail, having reference to the accompanying drawings, throughout the figures of which similar reference-letters serve to indicate similar parts in the apparatus.

Figure 3:
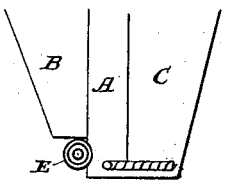
Figure 2:
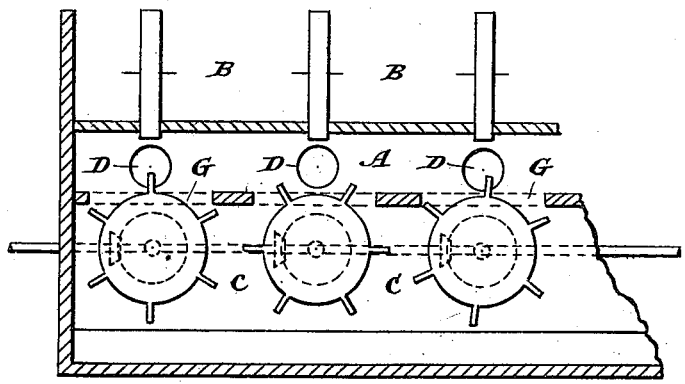

Figure 1 is a sectional end view or elevation in perspective of my improved supply-box and feed-operating gear; Fig. 2, a plan thereof, and Fig. 3 is an end view.

In Fig. 1, A is the central compartment, always partially vacant, projecting upward from the floor of which is shown one of a series of shoes or receivers D and the downward-projecting tube D', each of which tubes terminates in the ordinary and well-known drill or tubular hoe; B, the supply bin or compartment carrying the seed; E, the vertically-mounted and incased wheel, which when rotated by ordinary and well-known gearing feeds a continuous flow of the seed from the opening E' into the shoe-receiver D; C, the fertilizer-bin or supply-compartment carrying the fertilizing material, from which the horizontally-mounted and rotating spur-wheel, projecting for a given distance into the compartment A by means of a series of slots, such as G, in the base of the dividing-partition between A and C, carries a continuous supply of the fertilizer by means of the radial series of spurs into the vacant bin or compartment A, discharging it into the shoe-receiver D and tube D'. The seed and fertilizer mingle in receiver D, down which it passes in its mixed condition, and sown in the drill-furrow formed by the ordinary furrow-opener hoe, and similarly throughout the said series, the driver's seat being so placed that the shoe-receivers in the central partially-vacant compartment and the supply and commingling of the seed and fertilizer may be under the driver's continuous observation, so that he may see any defect in the continuous supply, mingling, and sowing operation and promptly remedy same.

What I claim as my invention, and desire to secure by Letters Patent, is—

In a seed and fertilizer mixer and sower, a carrying and distributing box divided into three bins or compartments, the central compartment being and remaining practically vacant with a series of shoe-receivers opening into and along the floor of such central compartment, the outer bins carrying respectively the seed and fertilizer, the feed-wheels and connections adapted to be drawn forward to operate and discharge in view of the driver in such manner that the seed and fertilizer mingle and pass down in a continuous flow into tubular hoes or drills and be sown in each hoe-furrow formed by the drills or hoes as before described.

In witness whereof I have hereunto set my hand in presence of two witnesses.

ISAAC JOB WEAVER.

Witnesses:
CHAS. COHEN,
T. J. BUTCHER.